(12) United States Patent
Twerdochlib et al.

(10) Patent No.: US 9,016,991 B2
(45) Date of Patent: Apr. 28, 2015

(54) BOLT TIGHTENER DEVICE FOR TIGHTENING A THROUGH-BOLT IN A GENERATOR CORE

(71) Applicants: Michael Twerdochlib, Oviedo, FL (US); Edward David Thompson, Casselberry, FL (US); Evangelos V. Diatzikis, Chuluota, FL (US)

(72) Inventors: Michael Twerdochlib, Oviedo, FL (US); Edward David Thompson, Casselberry, FL (US); Evangelos V. Diatzikis, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 224 days.

(21) Appl. No.: 13/863,473

(22) Filed: Apr. 16, 2013

(65) Prior Publication Data

US 2014/0306574 A1 Oct. 16, 2014

(51) Int. Cl.
| F16B 31/02 | (2006.01) |
| H02K 1/16 | (2006.01) |
| B23P 19/06 | (2006.01) |
| G01L 5/24 | (2006.01) |
| G01L 1/24 | (2006.01) |
| H02K 11/00 | (2006.01) |
| G01D 5/353 | (2006.01) |

(52) U.S. Cl.
CPC .............. H02K 1/16 (2013.01); B23P 19/067 (2013.01); F16B 31/028 (2013.01); G01L 5/243 (2013.01); G01L 1/246 (2013.01); H02K 11/001 (2013.01); *G01D 5/35316* (2013.01)

(58) Field of Classification Search
CPC .......... F16B 31/02; F16B 31/025; G01L 5/24

USPC ........... 411/14, 14.5, 916–917; 310/216.129; 173/2
See application file for complete search history.

(56) References Cited

U.S. PATENT DOCUMENTS

| 2,600,029 | A | * | 6/1952 | Stone ............................... 73/761 |
| 4,106,370 | A | * | 8/1978 | Kraus et al. ..................... 73/761 |
| 4,333,351 | A | * | 6/1982 | Bickford ......................... 73/761 |
| 4,672,866 | A | * | 6/1987 | Riera et al. .................... 81/57.37 |
| 5,222,399 | A |   | 6/1993 | Kropp |
| 5,945,665 | A | * | 8/1999 | Hay .......................... 250/227.14 |
| 6,204,771 | B1 | * | 3/2001 | Ceney ............................ 340/665 |
| 6,250,863 | B1 | * | 6/2001 | Kamentser et al. ............. 411/10 |
| 8,098,967 | B1 |   | 1/2012 | Bazzone |
| 2006/0137463 | A1 |   | 6/2006 | Nassar et al. |
| 2007/0113672 | A1 |   | 5/2007 | Cook et al. |
| 2008/0253858 | A1 | * | 10/2008 | Hsieh .............................. 411/14 |
| 2012/0026482 | A1 |   | 2/2012 | Dailey |

FOREIGN PATENT DOCUMENTS

| FR | 2352631 A1 | 12/1977 |
| KR | 20110047442 A | 5/2011 |
| WO | 2011019318 A1 | 2/2011 |

* cited by examiner

*Primary Examiner* — Roberta Delisle

(57) ABSTRACT

A generator stator core through-bolt tensioning device that automatically tightens the nut on the through-bolts that hold together and compress laminate plates of the stator core in a high voltage generator. A controller receives a signal from a measuring device, such as a fiber Bragg grating that measures the strain on the bolt, and based on that signal determines whether the nut needs to be tightened. If the controller determines that tightening is necessary, it will cause the tensioning device to automatically tighten the nut while the generator is in service, and use the measuring device to provide feedback of the tensioning of the through-bolt to know when to stop the device from tightening the nut.

20 Claims, 3 Drawing Sheets

BOLT TIGHTENER DEVICE FOR TIGHTENING A THROUGH-BOLT IN A GENERATOR CORE

BACKGROUND OF THE INVENTION

1. Field of the Invention

This invention relates generally to a device for tightening a through-bolt used in a stator core of a high voltage generator and, more particularly, to a device for automatically tightening a through-bolt that holds laminate plates together in a stator core of a high voltage generator while the generator is in service in response to detecting that the bolt has become loose.

2. Discussion of the Related Art

High voltage generators for generating electricity as a power source are well known in the art. A power plant may include gas turbine engines that each rotate a shaft by combusting fuel and air in a combustion chamber that expands across blades which rotate, and in turn causes the shaft to rotate. The output shaft of such an engine is coupled to an input shaft of a high voltage generator that is mounted to a rotor having a special configuration of coils. An electrical current provided in the rotor coils generates a magnetic flux around the coils, and as the rotor rotates, the magnetic flux interacts with windings in a stator core enclosing the rotor. The stator core windings include interconnected stator bars that have a special configuration to reduce eddy currents in the core, which would otherwise generate significant heat and possibly damage various generator components.

Stacked laminate plates in a stator core of this type are closely held together and compressed for proper operation of the generator to provide tight gas flow channels and the necessary sealing. During assembly of the generator, the laminate plates and stator bars are assembled in a vertical manner by sliding the components onto several circumferentially oriented bolts. For a typical generator, there may be sixty of these through-bolts, where the stator core may be about thirty feet long.

Once the stator core is in service and operating, it has an elevated temperature and is subject to vibrations and other stresses during normal generator operation. These forces and temperatures cause the various metal materials in the stator core to loosen so that, for example, the laminate plates are not as tightly packed and compressed as desired. Therefore, it is desirable to tighten the nuts on the bolts holding the stator core together to hold the plates in the desired state of compression. In order to tighten the bolts on the stator core, the generator needs to be taken out of service and disassembled, which is a complex and costly process. During maintenance of the generator, a technician will rotate the nuts using a torque wrench to ensure that the through-bolts are under the desired compression. However, because such a maintenance service on a generator is performed only periodically due to the costs involved, the generator may be operating without the desired compression in the stator core for extended periods of time. Also, the torque wrenches that are used for this purpose are not overly accurate in that the torque measurement provided by the wrench is subject to the friction of the nut on the threads.

SUMMARY OF THE INVENTION

In accordance with the teachings of the present invention, an automatic generator stator core through-bolt tensioning device is disclosed that automatically tightens the nut on the through-bolts that hold together and compress the laminate plates of the stator core in a high voltage generator. A controller receives a signal from a tension measuring device, such as a fiber Bragg grating sensor that measures the strain on the through-bolt, and based on that measurement signal determines whether the nut needs to be tightened to provide the desired level of core compression. If the controller determines that tightening is necessary, it will cause the tensioning device to automatically tighten the nut while the generator is in service, and use the measuring device to provide feedback of the tensioning of the through-bolt to know when to stop the device from tightening the bolt.

Additional features of the present invention will become apparent from the following description and appended claims, taken in conjunction with the accompanying drawings.

DETAILED DESCRIPTION OF THE EMBODIMENTS

The following discussion of the embodiments of the invention directed an automatic tightener for tightening the nuts on through-bolts holding laminate plates of a stator core together in a high voltage generator core is merely exemplary in nature and is in no way intended to limit the invention or its applications or uses. For example, the present invention has particular application for tightening the through-bolt nuts holding stator core plates together in a large high voltage generator. However, as well be appreciated by those skilled in the art, the present invention has application for tightening other bolts for other purposes.

Figure 1:
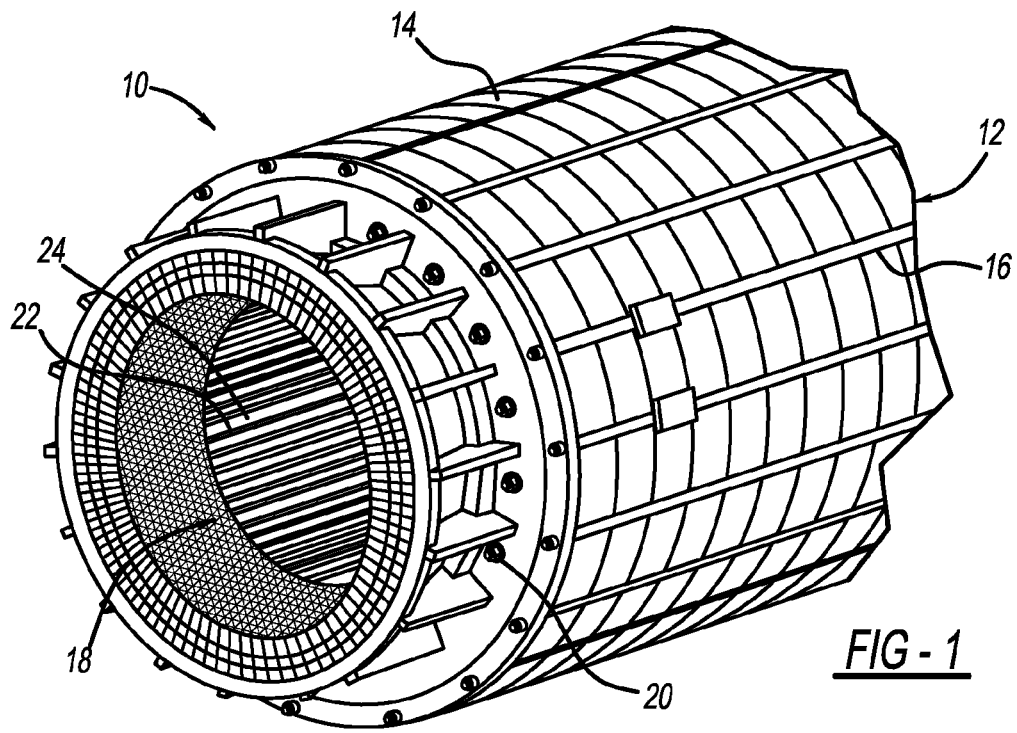
FIG. 1 is a cut-away, perspective view of a stator core for a high voltage generator.

FIG. 1 is a cut-away perspective view of a stator core 10 for a high voltage generator. The stator core 10 includes a magnetic cylindrical portion 12 formed by an assembly of stacked thin, iron laminate plates 14 aligned by key rods 16 and defining an internal bore 18. A series of through-bolts 20 extend through the laminate plates 14 to compress and hold the plates 14 to form the cylindrical portion 12. The combined laminate plates 14 define a series of circumferentially positioned slots 22 that are open to the bore 18 and define stator core teeth 24 therebetween.

Figure 2:
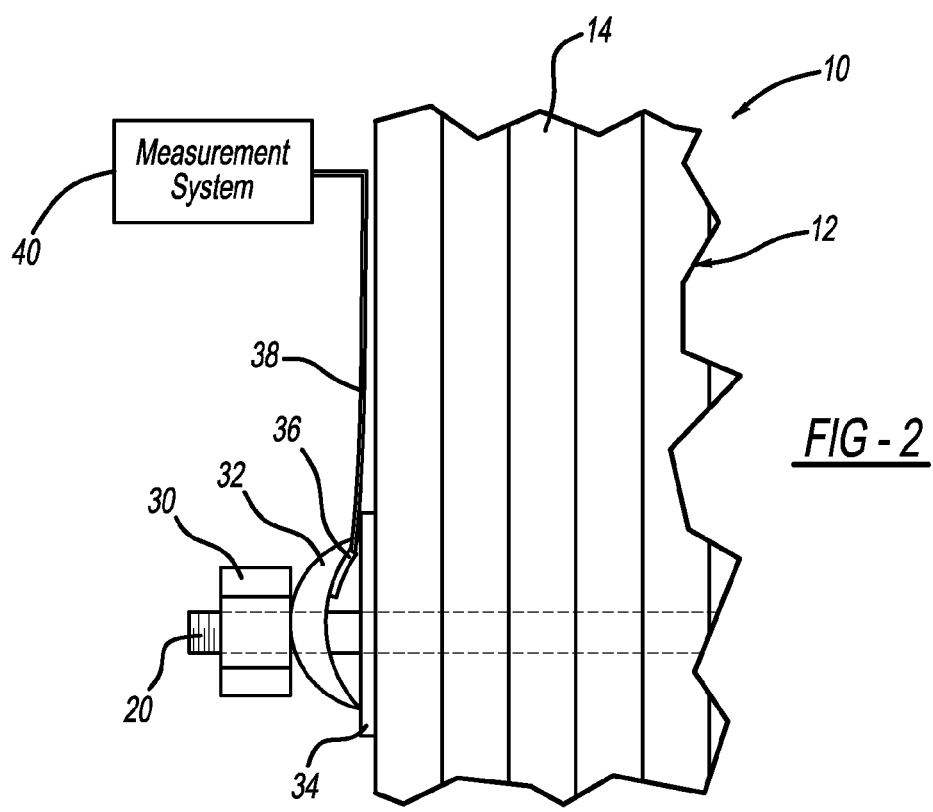
FIG. 2 is a side view of one of the through-bolts extending through stator core plates and showing a fiber Bragg grating (FBG) sensor for measuring the tension on the through-bolt.

FIG. 2 is a broken-away side view of a portion of the stator core 10 showing one of the through-bolts 20 extending through the plates 14. A through-bolt nut 30 is threaded onto an end of the through-bolt 20 against a conical washer 32, such as a Belleville washer. As the nut 30 is tightened onto the through-bolt 20 it applies pressure against the washer 32 and against an insulating washer 34, which causes the washer 32 to flex and compress, and thus, become less convex. Flexing of the washer 32 induces a strain on the washer 32 that can be measured by a strain measuring device. In this example, the strain measuring device includes an FBG sensor 36 formed in an optical fiber 38. As will be discussed in further detail below, optical signals reflected by the FBG sensor 36 are detected by a measurement system 40 provided outside of the stator core environment that provides an indication of the strain on the washer 32, which can be calibrated to provide an indication of how tight the nut 30 is on the through-bolt 20. Although the FBG sensor 36 is shown on the inside surface of the washer 32, in an alternate embodiment, the FBG sensor 36 can be provided on an outside surface of the washer 32.

The optical fiber 38 can be mounted to a surface of the plate 14, or other stator core structure, by any technique suitable for the purposes discussed herein, such as by a suitable high temperature epoxy or ceramic cement. Alternately, the optical fiber 38 can be embedded within the plate 14 by epoxying the fiber 38 into holes drilled in the plate 14 or by epoxying the fiber 38 into small trenches machined in the plate 14.

In one embodiment, there can be a single optical fiber that includes a plurality of the FBG sensors 36 positioned along the fiber 38, where each sensor 36 is mounted to a different conical washer 32 for each through-bolt 20 in the core 10. In an alternate embodiment, there can be a separate optical fiber including one of the FBG sensors 36 for each of the through-bolts 20 in the core 10. Because changes in temperature produce a small strain on the washer 32, a second FBG (not shown) can be provided in the fiber 38, or a second fiber including an FBG sensor can be provided, to measure the strain produced by temperature changes, which can then be subtracted out.

It is known in the art to employ fiber Bragg gratings (FBG) as sensors to measure strain, vibration and temperature for various applications. FBG sensors measure strain on an optical fiber at the Bragg grating location. This strain slightly alters the spacing of reflective grating lines in the FBG, thus affecting its reflective property. A broadband infrared (IR) signal is transmitted through the optical fiber to the FBG sensor. The degree of strain on the FBG sensor is measured by the wavelength of the IR radiation that is reflected from the FBG. As the strain spans the fiber Bragg lines, the wavelength of the reflected light is increased proportionately. As many as a hundred of such measurements can be provided on a single optical fiber by appropriately setting the spacing between the Bragg grating lines to prevent overlap in the wavelength of the reflected IR light from each Bragg grating. Such FBG systems can also operate in a transmission mode.

Figure 3:
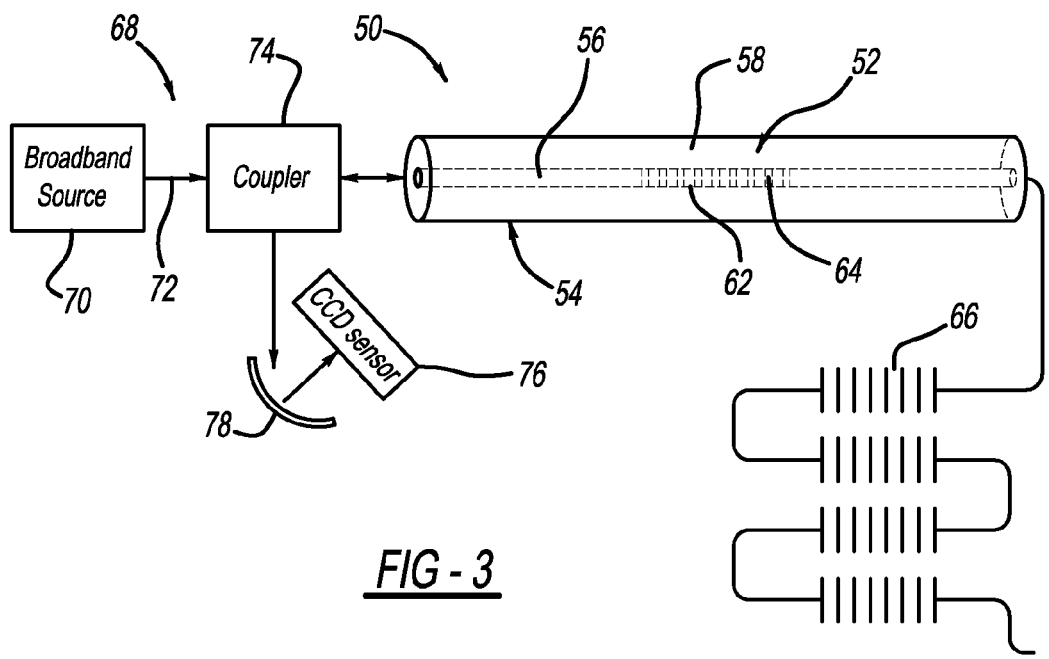
FIG. 3 is schematic block diagram of a fiber Bragg grating detection system.

FIG. 3 is a schematic type diagram of an FBG detection system 50 of the type discussed above and including an FBG sensor 52 formed in a section of an optical fiber 54. The optical fiber 54 includes an optical fiber core 56 surrounded by an outer cladding layer 58. The index of refraction of the cladding layer 58 is greater than the index of refraction of the fiber core 56 so that a light beam propagating down the fiber core 56 is reflected off of the transition between the fiber core 56 and the cladding layer 58 and is trapped therein. In one embodiment, the fiber core 56 is about 10 μm in diameter, which provides a multi-mode fiber for propagating multiple optical modes. The FBG sensor 52 is provided in the optical fiber 54 by creating an FBG 62 using a suitable optical writing process to provide a periodic pattern of sections 64 in the fiber core 56, where the sections 64 have a higher index of refraction than the rest of the fiber core 56, but a lower index of refraction than the cladding layer 58. For example, the index of refraction $n_3$ of the sections 64 is greater than the index of refraction $n_2$ of the fiber core 56 and the index of refraction $n_3$ of the sections 64 is less than the index of refraction $n_1$ of the cladding layer 58. Several more FBG sensors 66 are depicted in the optical fiber 54 and are selectively designed to provide the spacing between the grating sections so that they reflect a different wavelength of light than all of the other FBG sensors in the fiber 54.

As mentioned above, a change in temperature of an FBG will change the spacing of the sections 54 in the FBG that alters the wavelength of the reflected signal. Based on this phenomenon, it is known to use FBG sensors to measure temperature to provide a temperature calibration. For example, one of the other FBG sensors 66 can be used as a sensor that provides the temperature strain measurement.

As is known by those skilled in the art, the FBG 62 can be selectively designed so that the index of refraction $n_2$ of the fiber core 56, the index of refraction $n_3$ of the sections 64, and the spacing $\Lambda$ between the sections 64 define which wavelength $\lambda_B$ is reflected by the FBG sensor 52 based on equation (1) below.

$$\lambda_B = 2n_3 \Lambda \qquad (1)$$

The system 50 also includes a circuit 68 that generates the optical input signal and detects the reflected signal from the one or more FBG sensors. The circuit 68 includes a broadband light source 70 that generates a light beam 72 that is passed through an optical coupler 74 and is directed into and propagates down the optical fiber 54 towards the FBG sensor 52. The light that is reflected by the FBG sensor 52 propagates back through the optical fiber 54 and is directed by the optical coupler 74 to a dispersive element 78 that distributes the various wavelengths components of the reflected beam to different locations on a linear charge-coupled device (CCD) sensor 76, or some other suitable optical detector array, such as a Bragg oscilloscope. A system of optical filters can also be used to reduce system cost, while limiting the number of FBG sensors on the fiber 54. By providing the broadband source 70 and the dispersive element 78, more than one reflected wavelength $\lambda_B$ can be detected by the CCD sensor 76, which allows more than one of the FBG sensors 52 to be provided within the fiber 54.

As discussed above, the nuts 30 that are threaded onto the through-bolts 20 loosen over time during operation of the stator core 10, which may cause an undesirable loss of compression between the plates 14. A specialized configuration of the detection system 50 can use the FBG sensor 36 to detect the strain on the washer 32 to provide an indication of how tight the nut 30 is on the through-bolt 20. As will be discussed below, the present invention proposes an automatic nut and bolt tightening system that monitors the strain on the washer 32 using the FBG sensor 36, and if the tension on the through-bolt 20 falls below a predetermined threshold, automatically tightens the nut 30 while the stator core 10 is in service, which prevents it from being necessary to tighten the nut 30 when the core 10 is down for maintenance. The processing circuitry of the detection system can be provided outside of the working environment of the stator core 10, where optical fibers will be connected to the processing circuitry to provide the optical input signal and the reflected Bragg signals, and electrical lines can be used to control the nut tightener within the stator core 10. Although the discussion herein is specific to only one of the through-bolts 20 in the stator core 10, it is to be understood that each of the many through-bolts 20 in the stator core 10 will include a separate FBG sensor for measuring the strain on each washer 32 and a separate nut tightener will be provided for each of the several through-bolts 20. Also, as mentioned, a separate FBG sensor can be provided to measure strain as a result of temperature, where it may be necessary to only include a single FBG sensor for the entire stator core 10 for that purpose.

Figure 4:
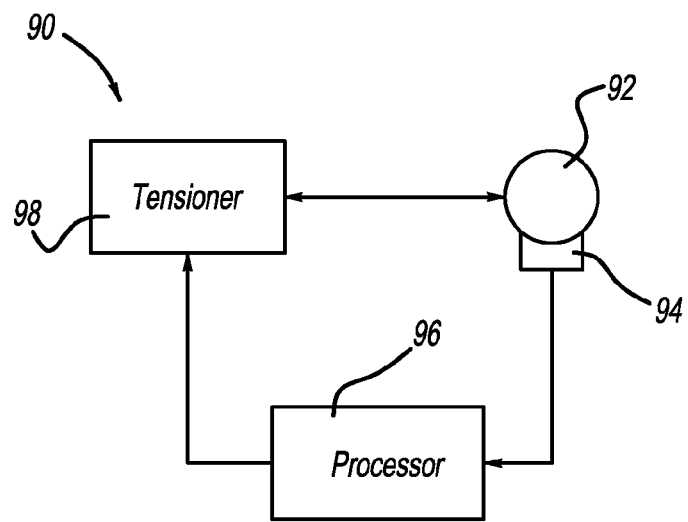
FIG. 4 is a schematic block diagram of a tightening system for tightening a nut on a through-bolt in a stator core.

FIG. 4 is a general representation of a strain detection and nut tightening system 90 that performs the through-bolt tightening operation discussed above, where a nut 92 represents the nut 30. An FBG sensor 94 is shown on or proximate to the nut 92, and provides an optical reflected Bragg signal indicating the strain on the washer 32, or otherwise, and thus the tightness of the nut 92 or the through-bolt 20 to a processor 96. The processor 96 converts the optical signal to an indication of the tightness of the nut 92 and compares that tightness to a predetermined tension threshold to determine whether the nut 92 needs to be tightened. If the processor 96 determines that the nut 92 does need to be tightened, it sends a signal to a tensioner 98 that rotates the nut 30 to provide the desired tension and compression. As the tensioner 98 is tightening the nut 92, the strain on the washer 32 will increase, which is measured by the FBG sensor 94 to provide a feedback signal to the processor 96 that can tell the tensioner 98 when to stop tightening the nut 92.

In one embodiment, the processor 96 is positioned outside of the stator core environment, and as such is not subject to the internal heat and vibration generated by the core 10. Alternately, the processor 96 can be provided inside the enclosure of the generator to limit the number of lines going into and out of the sealed stator core environment.

Figure 5:
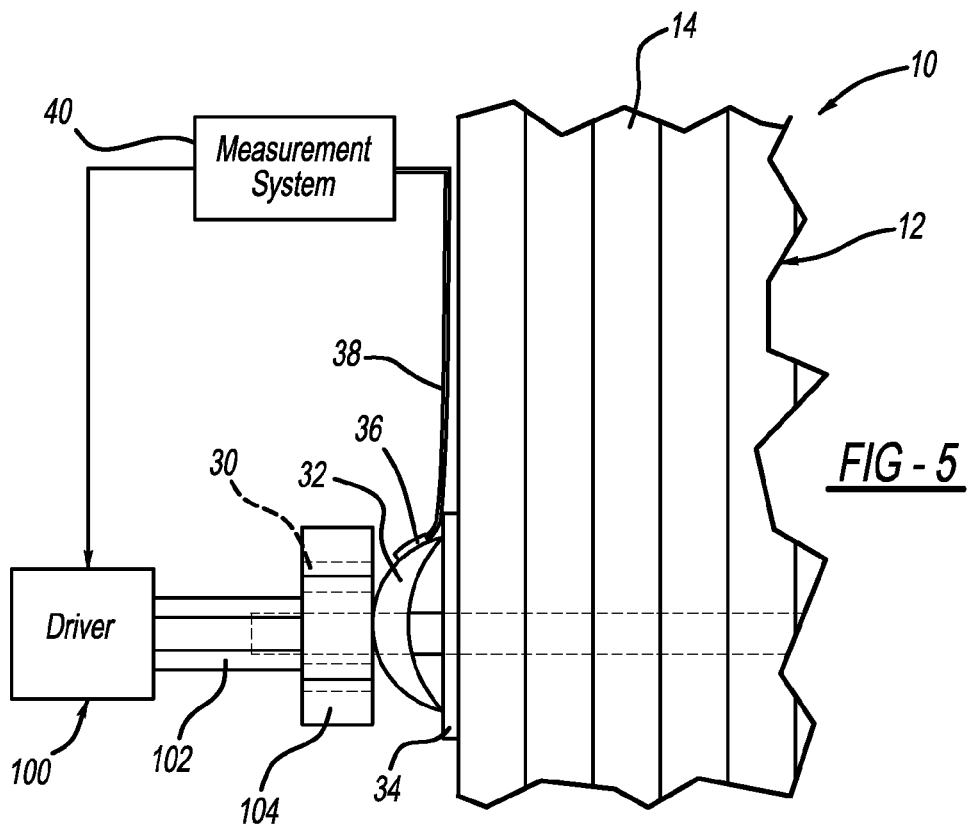
FIG. 5 is a cut-away side view of a through-bolt extending through the stator core shown in FIG. 2 and including a socket driver for automatically tightening the nut.

The present invention accommodates any suitable technique for automatically tightening the nut 30 consistent with the discussion herein. FIG. 5 is the broken-away side view of the stator core 10 shown in FIG. 2 and including a socket driver 100 for rotating the nut 30 in response to the strain measurement signals processed by the measurement system 40. In this embodiment, the FBG sensor 36 is shown positioned on an outer surface of the washer 32. Particularly, if the measurement system 40 determines that the strain on the washer 32 has fallen below a predetermined threshold, the measurement system 40 provides a control signal to the socket driver 100 to tighten the nut 30. The driver 100 includes a drive shaft 102 that rotates a socket 104 enclosing and grabbing the nut 30. As the nut 30 is being tightened, the strain signal from the FBG sensor 36 tells the measurement system 40 when to stop the driver 100 from rotating the nut 30.

Figure 6:
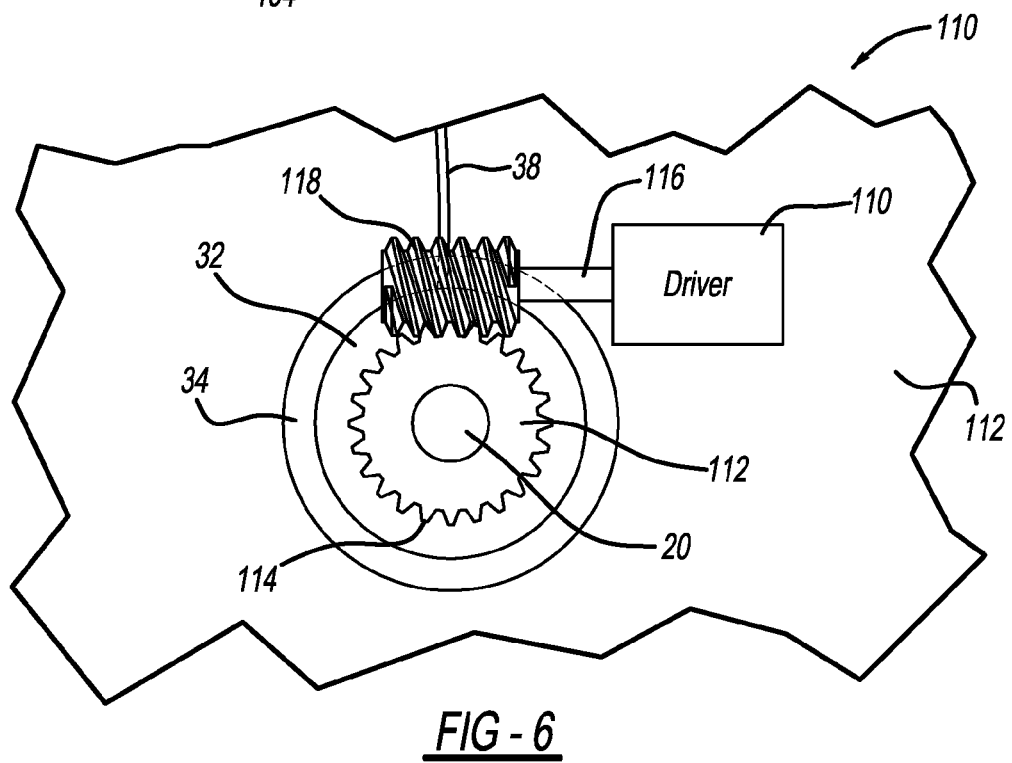
FIG. 6 is a cut-away front view of a through-bolt extending through the stator core shown in FIG. 2 and including a worm gear driver for automatically tightening the nut.

FIG. 6 is the broken-away side view of the stator core 10 shown in FIG. 2 and including a worm-gear driver 110 for providing the through-bolt tensioning. In this embodiment, the nut 30 is replaced with a nut 112 including outer gear teeth 114. The driver 110 includes a drive shaft 116 that drives a worm gear 118 in mesh engagement with the gear teeth 114, as shown. When the driver 110 receives a control signal from the measurement system 40 to tighten the nut 112, it rotates the shaft 116 to cause the worm gear 118 to turn the nut 112.

The drivers 100 and 110 can use any suitable power source for tightening the respective nut. For example, that power source can be hydraulic, pneumatic, electrical, etc. The system can be designed to use a minimal amount of power to rotate the nut where a lower amount of power may require more time to provide the nut tightening.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A through-bolt tensioning system for automatically tightening a nut on a through-bolt that extends through and compresses a series of laminate plates defining a stator core, said system comprising:
   a tension measuring device for determining the tension on the through-bolt;
   a controller responsive to a tension signal from the tension measuring device indicating the tension on the through-bolt, said controller comparing the tension signal to a tension threshold and determining that the through-bolt nut should be tightened if the tension signal is outside of the tension threshold by a predetermined amount; and
   a tensioning device receiving a control signal from the controller, said tensioning device rotating the through-bolt nut to increase the tension on the through-bolt in response to the control signal.

2. The system according to claim 1 wherein the tensioning device includes a socket driver and a socket that encloses and turns the nut.

3. The system according to claim 1 wherein the tensioning device includes a worm gear driver and a worm gear and the nut includes an outer gear where the worm gear meshes within the outer gear to rotate the nut.

4. The system according to claim 1 wherein the tension measuring device is a strain measuring device.

5. The system according to claim 4 wherein the strain measuring device includes a fiber Bragg grating sensor positioned within a fiber.

6. The system according to claim 5 wherein a conical washer is provided on the through-bolt in contact with the through-bolt nut, said conical washer becoming more flattened in response to the through-bolt nut being tightened on the through-bolt, said fiber Bragg grating sensor being positioned on the conical washer.

7. The system according to claim 6 wherein the fiber Bragg grating sensor is positioned on an inside surface of the washer.

8. The system according to claim 6 wherein the fiber Bragg grating sensor is positioned on an outside surface of the washer.

9. The system according to claim 1 wherein the controller is positioned outside of the stator core environment.

10. The system according to claim 1 wherein the controller is positioned within the stator core environment.

11. A through-bolt tensioning system for automatically tightening a nut on a through-bolt that extends through and compresses a series of laminate plates defining a stator core, said nut being positioned against a conical washer on the through-bolt, said system comprising:
   a fiber Bragg grating sensor provided in an optical fiber and being positioned on the conical washer, said fiber Bragg grating sensor providing a reflected optical signal;
   a controller responsive to the reflected optical signal from the fiber Bragg grating sensor and converting the reflected optical signal to a strain signal identifying the strain on the washer, said controller comparing the strain signal to a strain threshold and determining that the through-bolt nut should be tightened if the strain signal is outside of the strain threshold by a predetermined amount; and
   a tensioning device receiving a control signal from the controller, said tensioning device rotating the through-bolt nut to increase the tension on the through-bolt in response to the controller determining that the strain signal is outside the strain threshold.

12. The system according to claim 11 wherein the tensioning device includes a socket driver and a socket that encloses and turns the nut.

13. The system according to claim 11 wherein the tensioning device includes a worm gear driver and a worm gear and the nut includes an outer gear where the worm gear meshes within the outer gear to rotate the nut.

14. The system according to claim 11 wherein the fiber Bragg grating sensor is positioned on an inside surface of the washer.

15. The system according to claim 11 wherein the fiber Bragg grating is positioned on an outside surface of the washer.

16. The system according to claim 11 wherein the controller is positioned outside of the stator core environment.

17. The system according to claim 11 wherein the controller is positioned within the stator core environment.

18. A generator stator core comprising:
 a plurality of circular plates positioned adjacent to each other to form a stator column;
 a plurality of through-bolts circumferentially disposed around the stator column and extending through the circular plates from one end of the column to an opposite end of the column, each through-bolt including a threaded end on which is positioned a conical washer and a through-bolt nut, wherein the through-bolt nuts on the through-bolts are tightened against the washers to compress the circular plates and hold the stator column together; and
 a through-bolt tensioning system including a fiber Bragg grating sensor for each through-bolt provided in at least one optical fiber and being mounted to the conical washer, said system further including a controller providing an optical signal to each of the fiber Bragg sensors and receiving a reflected optical signal from the fiber Bragg grating sensors where the reflected optical signal provides an indication of strain on the washer, said controller converting the reflected optical signal to a tension signal indicating the tension on the through-bolt nut, said controller comparing the tension signal to a tension threshold and determining that the through-bolt nut should be tightened if the tension signal is outside the tension threshold, said system further including a tensioning device receiving a control signal from the controller, said tensioning device rotating the through-bolt nut to increase the tension on the through-bolt in response to the control signal.

19. The stator core according to claim 18 wherein the tensioning device includes a socket driver and a socket that encloses and turns the nut.

20. The stator core according to claim 18 wherein the tensioning device includes a worm gear driver and a worm gear and the nut includes an outer gear where the worm gear meshes within the outer gear to rotate the nut.

* * * * *